United States Patent
Shenfield et al.

(10) Patent No.: US 7,426,194 B2
(45) Date of Patent: Sep. 16, 2008

(54) SYSTEM AND METHOD FOR ASYNCHRONOUS WIRELESS SERVICES USING REVERSE SERVICE SCHEMA GENERATION

(75) Inventors: Michael Shenfield, Richmond Hill (CA); Kamen Vitanov, Toronto (CA); Brindusa Fritsch, Toronto (CA)

(73) Assignee: Research In Motion, Waterloo (CA)

( * ) Notice: Subject to any disclaimer, the term of this patent is extended or adjusted under 35 U.S.C. 154(b) by 559 days.

(21) Appl. No.: 10/913,454

(22) Filed: Aug. 9, 2004

(65) Prior Publication Data

US 2005/0063335 A1 Mar. 24, 2005

Related U.S. Application Data

(60) Provisional application No. 60/503,981, filed on Sep. 17, 2003.

(51) Int. Cl.
*H04Q 7/00* (2006.01)

(52) U.S. Cl. ................... 370/324; 370/350; 370/395.62; 370/503; 455/412.2; 455/414.3

(58) Field of Classification Search ......... 370/328–339, 370/324, 350, 395.62, 503, 507; 455/412.2, 455/412.1, 414.3, 466
See application file for complete search history.

(56) References Cited

U.S. PATENT DOCUMENTS

| | | | |
|---|---|---|---|
| 6,222,829 B1 * | 4/2001 | Karlsson et al. | 370/329 |
| 6,424,828 B1 * | 7/2002 | Collins et al. | 455/412.1 |
| 6,453,162 B1 * | 9/2002 | Gentry | 455/433 |

(Continued)

FOREIGN PATENT DOCUMENTS

WO    WO 03/083602 A2    10/2003

OTHER PUBLICATIONS

Notification of Transmittal of International Preliminary Report on Patentability for InternationalPatent Application No. PCT/CA2004/001460,Jan. 23, 2006, 14 pages, International Preliminary Examining Authority.

(Continued)

*Primary Examiner*—Matthew Anderson
*Assistant Examiner*—Minh Dao
(74) *Attorney, Agent, or Firm*—Gowling Lafleur Henderson LLP

(57) ABSTRACT

A notification service and correspondingly configured wireless device for providing asynchronous communications over a communication network for an application of the wireless device in communication with a selected service. The selected service has a source schema definition including an output notification definition associated with a correlation ID. The notification service comprises a reverse schema definition of the source schema definition such that the reverse schema definition includes an input notification operation definition corresponding to the output notification definition. The input definition is associated with the correlation ID and a parameter list of the output definition. The output definition is for defining an output message of the selected source that corresponds to an input message of the notification service defined by the input definition. The notification service has a first communication port adapted for receiving the output message of the selected service as the input message to the notification service, wherein the messages are adapted to include the correlation ID for identifying the network address of the wireless device. The information contents of the output message of the selected source are transmitted as an asynchronous communication to the application of the wireless device identified by the correlation ID.

10 Claims, 7 Drawing Sheets

U.S. PATENT DOCUMENTS

| | | | |
|---|---|---|---|
| 6,631,519 B1 * | 10/2003 | Nicholson et al. | 717/169 |
| 6,763,384 B1 * | 7/2004 | Gupta et al. | 709/224 |
| 7,126,937 B2 * | 10/2006 | Crosbie et al. | 370/350 |
| 7,152,090 B2 * | 12/2006 | Amirisetty et al. | 709/200 |
| 2001/0034225 A1 * | 10/2001 | Gupte et al. | 455/412 |
| 2003/0084128 A1 * | 5/2003 | Anderson et al. | 709/220 |
| 2003/0131338 A1 * | 7/2003 | Georgalas | 717/104 |
| 2006/0025113 A1 * | 2/2006 | Nguyen et al. | 455/412.1 |

OTHER PUBLICATIONS

Internation Search Report & Written Opinion, International Application No. PCT/CA2004/001460, date of mailing Jan. 7, 2005.

* cited by examiner

SYSTEM AND METHOD FOR ASYNCHRONOUS WIRELESS SERVICES USING REVERSE SERVICE SCHEMA GENERATION

This application claims priority from U.S. Provisional Application No. 60/503,981, filed Sep. 17, 2003, herein incorporated by reference.

The present invention relates to asynchronous communications between schema based services and wireless devices.

BACKGROUND OF THE INVENTION

In real-life network applications there is a lot of information that is available to a user but hardly accessible, as the user doesn't know when the information is posted or when there is a change in the status of the posted content. Such information ideally needs to be "pushed" over the network to the user either periodically or when certain predefined events occur. Some examples of possible push situations are arrival of new e-mail, stock market information, multi-user game updates, etc. A push notification can be a Boolean value which informs the client device that a detailed response is available for retrieval from the web service. Alternatively, the push notification can return the updated data in response to an earlier submitted request message from the client device.

Web Services have become a ubiquitous standard for access to content resources as well as communicating to back-end servers. Their number and complexity have increased considerably in recent years. However, invoking Web Service operations from a wireless device using synchronous communication methods exclusively is considered expensive and impractical. Most Web Services employ protocols with a large footprint (e.g. SOAP) and are designed mostly for synchronous communication ("request/response" or "pull") on wired networks. In a synchronous scenario, the client initiates the communication by sending a request to the server and waits to receive the response on the same connection. However, in the wireless space, where resources and bandwidth can be limited and data traffic cost can be high, synchronous communication is undesirable.

A common technique to deliver content to the wireless device is when the user of the device requests or "pulls" the content from the network. In other words, the content is constantly present in the network, but the user needs to issue retrieval request to access the information (e.g. using a browser on the mobile device). Current wireless systems operate by the wireless device repeatedly polling the server for data to satisfy the request. From a practical point of view, wireless communications can have higher cost than wired communications and usually are characterized by higher latency times, making a 'pull' from a wireless device inherently expensive. Slow connection times sometimes might be critical to the user's experience, such as extended wait times to process the request, including periodic loss of services connection during the wait time.

SUMMARY OF THE INVENTION

It is an object of the present invention to provide a system and method for enabling asynchronous communication between a schema defined service and a wireless device to obviate or mitigate at least some of the above presented disadvantages.

Web Services have become a ubiquitous standard for access to content resources as well as communicating to back-end servers. Their number and complexity have increased considerably in recent years. However, invoking Web Service operations from a wireless device using synchronous communication methods exclusively is considered expensive and impractical. However, in the wireless space, where resources and bandwidth can be limited and data traffic cost can be high, synchronous communication is undesirable. Contrary to present communication systems there is provided a notification service for providing asynchronous communications over a communication network for an application of a wireless device in communication with a selected service. The selected service has a source schema definition including an output notification definition associated with a correlation ID. The notification service comprises a reverse schema definition obtained from the source schema definition such that the reverse schema definition includes an input notification operation definition corresponding to the output notification definition. The input definition is associated with the correlation ID and a parameter list of the output definition. The output definition is for defining an output message of the selected source that corresponds to an input message of the notification service defined by the input definition. The notification service has a first communication port adapted for receiving the output message of the selected service as the input message to the notification service, wherein the messages are adapted to include the correlation ID for identifying the network address of the wireless device. The information contents of the output message of the selected source are transmitted as an asynchronous communication to the application of the wireless device identified by the correlation ID.

According to one aspect there is provided a notification service for providing asynchronous communications over a communication network for an application of a wireless device in communication with a selected service, the selected service having a source schema definition including an output notification definition associated with a correlation ID, the notification service comprising: a reverse schema definition of the source schema definition, the reverse schema definition including an input notification operation definition corresponding to the output notification definition, the input definition being associated with the correlation ID and a parameter list of the output definition, the output definition for defining an output message of the selected source that corresponds to an input message of the notification service defined by the input definition; and a first communication port adapted for receiving the output message of the selected service as the input message to the notification service, the messages adapted to include the correlation ID for identifying the network address of the wireless device; wherein the information contents of the output message of the selected source are transmitted as an asynchronous communication to the application of the wireless device identified by the correlation ID.

According to a further aspect there is provided a method for providing asynchronous communications over a communication network for an application of a wireless device in communication with a selected service, the selected service having a source schema definition including an output notification definition associated with a correlation ID, the method comprising the steps of: receiving an output message of the selected service on a first communication port of a notification service, the notification service having a reverse schema definition of the source schema definition, the reverse schema definition including an input notification operation definition corresponding to the output notification definition, the input definition being associated with the correlation ID and a parameter list of the output definition, the output definition for defining an output message of the selected source that corresponds to an input message of the notification service defined by the input definition; and recognising the contents of the output message as being the contents of the input message to the notification service, the messages adapted to include the correlation ID for identifying the network address of the wireless device; wherein the information contents of the input message of the selected source are subsequently transmitted as an asynchronous communication to the application of the wireless device identified by the correlation ID.

According to a still further aspect there is provided a wireless device configured for providing asynchronous communications over a communication network for an application of the wireless device in communication with a selected service, the selected service having a source schema definition including an output notification definition associated with a correlation ID, the wireless device comprising: a receiver for receiving an asynchronous response notification transmitted from a notification service, the notification service adapted for having a reverse schema definition of the source schema definition, the reverse schema definition including an input notification operation definition corresponding to the output notification definition, the input definition being associated with the correlation ID and a parameter list of the output definition, the output definition for defining an output message of the selected source that corresponds to an input message of the notification service defined by the input definition, the response notification having the information contents of the input message; and a correlator for recognising the correlation ID in the response notification, the correlation ID for identifying the network address of the wireless device and for matching the received response notification to an earlier request notification transmitted to the selected service from the application.

According to a still further aspect there is provided a method for providing asynchronous communications over a communication network for an application of a wireless device in communication with a selected service, the selected service having a source schema definition including an output notification definition associated with a correlation ID, the method comprising the steps of: receiving an asynchronous response notification transmitted from a notification service, the notification service adapted for having a reverse schema definition of the source schema definition, the reverse schema definition including an input notification operation definition corresponding to the output notification definition, the input definition being associated with the correlation ID and a parameter list of the output definition, the output definition for defining an output message of the selected source that corresponds to an input message of the notification service defined by the input definition, the response notification having the information contents of the input message; and matching the received response notification to an earlier request notification using the correlation ID, the correlation ID present in the response notification and present in the request notification transmitted earlier to the selected service from the application.

BRIEF DESCRIPTION OF THE DRAWINGS

These and other features of the preferred embodiments of the invention will become more apparent in the following detailed description in which reference is made to the appended drawings, by way of example only, wherein.

DESCRIPTION OF THE PREFERRED EMBODIMENTS

Network System

Figure 1:
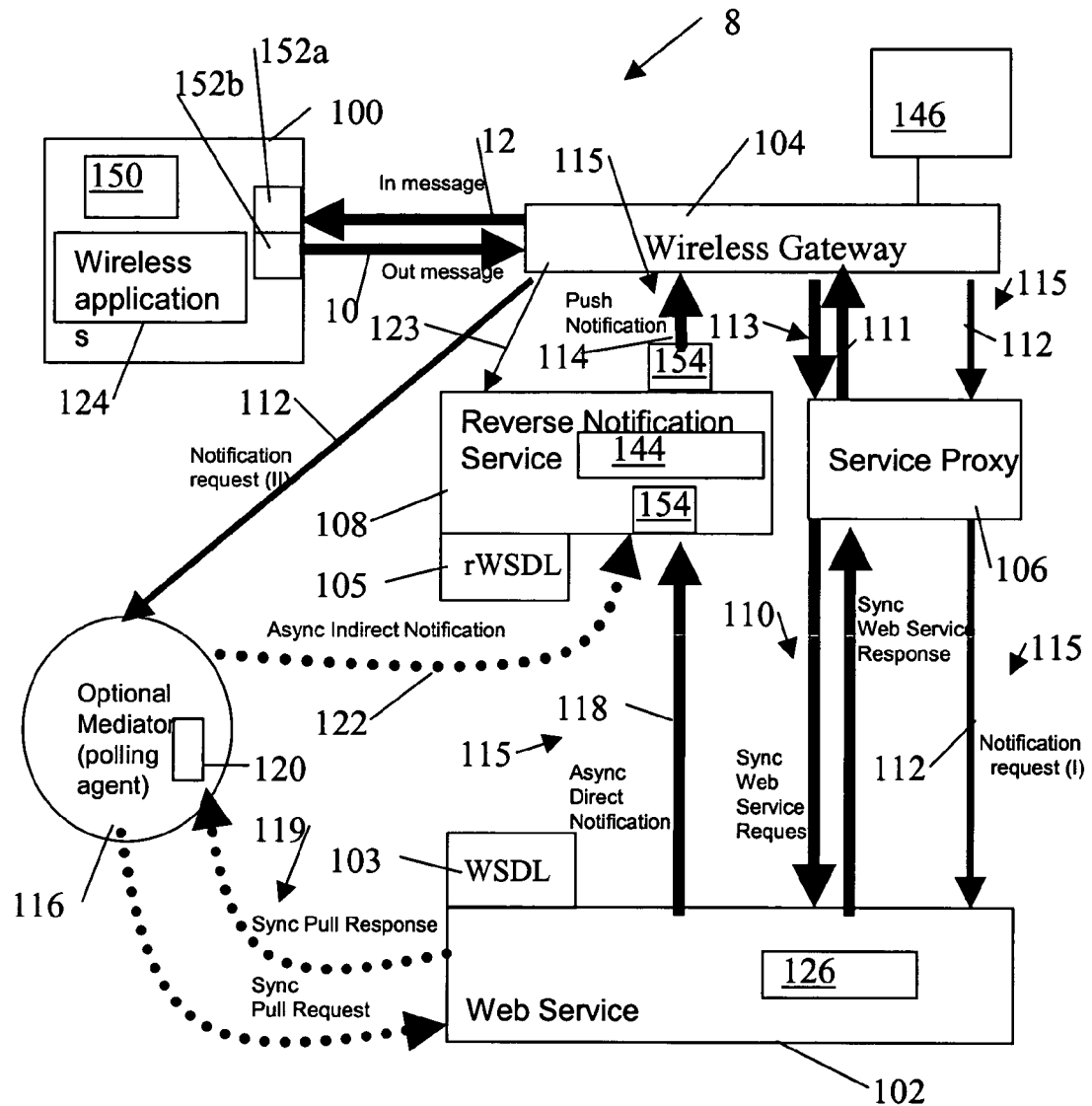
FIG. 1 is a block diagram of a network system.

Referring to FIG. 1, a wireless communication system 8 has a plurality of wireless devices 100 communicating via queries/requests 10 and responses 12 through a wireless gateway 104 and ultimately with one or more generic schema defined services 102. The requests 10 and responses 12 can be delivered as synchronous 110 or asynchronous 115 communications, as further described below. The generic services provided by the service 102 can be Web Services and/or other generic services such as but not limited to SQL Databases, IDL-based CORBA and RMI/IIOP systems, Legacy Databases, J2EE, SAP RFCs, and COM/DCOM components. The service 102 is described by a service description 103, representing a source schema definition of the Service 102, and is connected to the gateway 104 by a service proxy server 106 and a reverse notification server 108. It is recognised that the functionality of the servers 106, 108 could be hosted on one server (not shown) or on a distributed network of servers, as desired. Further, it is recognised that the servers 106, 108 could be provided as part of the service 102. The proxy server 106 provides for synchronous messages 110 (i.e. request/response and/or pull) communication between the device 100 and the service 102, and the reverse server 108 provides for asynchronous messages 115 between the device 100 and the service 102 as further defined below. The devices 100 have a receiver 152a for receiving messages 12 from the gateway 104 as well as have a transmitter 152b for sending messages 10 to the gateway 104 for eventual delivery to such as but not limited to the service 102.

In the synchronous scenario, the client device 100 initiates a synchronous request communication 113 with the service 102 by sending the initial request 10 to the server 106 via the gateway 104, on a connection, and expecting to receive the appropriate response 12 as a synchronous response communication 111 on the same connection. The delivery of synchronous content to the wireless device 100 is when the user of the device 100 requests or "pulls" the content from a network (not shown). In other words, the content is constantly accessible by the network, but the user needs to issue the retrieval request 10 to ultimately access the information (e.g. using a browser on the mobile device 100). In general, synchronous Web services 102 can be defined as services that are invoked over existing Web protocols by a client that blocks/waits for a response. In program-to-program communication, synchronous communications 110 require that each end (i.e. the device 100 and the service 102) of an exchange of communication 111,113 respond in turn without initiating a new connection. A typical activity that might use a synchronous protocol would be a transmission of files from one point to another. As each synchronous request communication 113 is received, the synchronous response communication 111 is returned indicating success or the need to resend regarding the previous synchronous request communication 113. Each successive transmission of data on the same synchronous connection requires the response communication 111 to the previous request communication 113 before a new request communication 113 can be initiated between the device 100 and the service 102. Therefore, the synchronous communications 110 consist of round-trip communications 111, 113 in which the sender (for example the device 100 or the service 102) waits for a reply. It is recognised that the synchronous communications 110 could be other than shown in FIG. 1, in which the service 102 initiates the synchronous request communication 113 with the device 100 and expects to receive the corresponding synchronous response communication 111 from the device 100.

For example, synchronous Web services 102 can be better served by RPC-oriented messaging. When two computers (e.g. the device 100 and the service 102) talk to each other, the exchange is often the synchronous 110 form of communication known as a remote procedure call, or RPC. With an RPC, one computer 102/100 actually executes a program on the other computer 100/102 as if it were a local application. Examples of synchronous communications 110 are submitting a Web page form and waiting for a confirmation page, as well as typical transactions—say, transferring money from checking to savings. These example transactions must take place very quickly and reliably, because the various systems involved must wait to make sure the transaction was successful before they go about their business. Accordingly, it is recognized that the synchronous communications 110 involve communications 111,113 transmitted and received over the same connection/channel established between the device 100 and the service 102.

Referring again to FIG. 1, synchronous program communication 110 is contrasted with asynchronous program communication 115. Asynchronous Web services 102 can be defined as services that are invoked over existing Web protocols by a client (i.e. the device 100) that does not wait for a response on the same connection/channel, but does expect a response at a later time on a different connection/channel. Therefore, in contrast with the synchronous communications 110, the sender (e.g. device 100) can submit the initial request 10, and then go about its work. If the reply 12 does come, then the original sender can pick it up when it wants. E-mail is one example where asynchronous communication between the device 100 and the service 102 is desired. A further example of asynchronous communication 115 is the performing of long-running transactions where the transaction might have multiple steps, for example, company A submitting a purchase order to company B, who fulfills the order and then submits the invoice to company A, who pays it. Such a transaction might take weeks, and thus must be handled asynchronously.

In the asynchronous scenario, the client device 100 initiates a request notification 112 with the service 102 by sending the initial request 10 to the server 106 via the gateway 104, on a connection, and expects to receive the appropriate response 12 as an asynchronous response communication 114 on a different connection. Referring again to FIG. 1, the system 8 uses the reverse server 108, where given the specific initial request notification 112 (such as initiated by the user or system services 102) to be notified with specific data on predefined conditions, the asynchronous push notification 114 is used. In asynchronous communications 115, the push notification 114 is used to send the appropriate data to the user's device 100 as soon as the data is available and/or the predefined response conditions have been met to trigger the data transmission as the push notification 114. For example, the notification 114 may be a compilation of numerous data instances sent by the service 102 to the server 108 as multiple notifications 118 in response to the original notification 112 and/or internal service 102 message generation (i.e. not specifically related to any external notifications 112). The communication protocol and device 100 addressing are device-specific and the server 108 must be aware of them, for example via the request notification 112. It is recognized that the request notification 112 could be manipulated by either of the servers 106, 108, if desired, as well as being an internal command (no interaction with the server 106) generated by the service 102 using known addressing information of the device 100 (addressable wireless devices 100) or being an external command generated by an external entity (not shown). The push notification 114 can be a Boolean value which informs the client device 100 that the detailed response 12 is available for retrieval from the web service 102. Alternatively, the push notification 114 can return the updated data in the response 12 to the request message 10 of the client device 100, initially sent to the service 102 as the request notification 112, or as a result of internal service 102 commands or third party requests. The reverse notification server 108 is deployed between the existing Web Service 102 and the wireless device 100, and hosts a 'reverse' definition 105 of the Service 102 representing a reverse schema definition 105 generated from source definition 103, as further described below. The server 108 can receive multiple data updates in the form of corresponding notifications 118 from a variety of sources (for example multiple services 102) and as a client to the wireless device 100 forwards these updates as the push notifications 114. It is recognised that the notifications 118 can be the result of the earlier asynchronous request notifications 112, internal service 102 commands, or a combination thereof.

Referring again to FIG. 1, one configuration of the system 8 for supplying the push response notification 114 uses the server 108 running on the device 100 as a callback endpoint. It is also recognized that this configuration is feasible for some devices 100 with increased capabilities, which can host the reverse service 105 as further described below. Another configuration uses a mediator service server 116 positioned between the device 100 and the Web Service 102, and hosts the Web Service callback endpoint. The mediator server 116 (e.g. polling agent) is a distinct intelligent component that periodically polls the source Web Service 102 through synchronous intermediate polling communications 119 for specific data changes corresponding to the initial request communication 112. The server 116 uses a rules engine 120 to know what to poll for, and when and how to forward meaningful results to the reverse Web Service 105 as an indirect asynchronous response notification 122. The engine 120 can direct the server 116 to poll the service 102 and other services (not shown) via a polling protocol to gather data required to formulate the asynchronous response notification 122, similar to the notification 118. The rules of the engine 120 can be provided by the source of the wireless application 124 (directly or indirectly) and/or the service 102, as desired. The server 116 acts as a client to the original Web Service 102 and also as a client for the reverse notification server 108. It is recognised that the application of reverse WSDL can be done in such as but not limited to two different scenarios, for example:

1) the Web Service 102 designed to work directly with the Reverse Notification Service 108 and
2) the mediator server 116 (polling agent) is introduced between the Reverse Web Service 108 and the source Web Service 102 for synchronous data retrieval corresponding to the original request 12.

Accordingly, the asynchronous push notification 114 is returned to the device 100 as the response 12 in connection with the request 10, when sent, to the web service 102 as the initial request notification 112. The push notification 114 can be sent as either the direct asynchronous notification 118 from the service 102 or as the indirect asynchronous notification 122 via the mediator 116. The Reverse Web Service 105 and the optional mediator 116 facilitate the mobilization of existing, mostly synchronous Web Services 102. More technically advanced Web Services 102 can also be originally designed to support asynchronous communication, if desired. Web services 102 are selected for the following description of the system 8, for the sake of simplicity. However, it is recognized that other generic schema defined services 102 could be substituted in the system 8 for the web services 102, if desired.

Referring again to FIG. 1, the devices 100 transmit and receive asynchronous and synchronous communications 110, 115, respectively, when in communication with the servers 106,108 of the web service 102. The device 100 can operate as a web client of the web service 102 by using the communications 110,115 in the form of message header information and associated data content, for example requesting and receiving product pricing and availability from an on-line merchant. The web service 102 is an example of a system with which client application programs 124 on the devices 100 interact via the wireless gateway 104 in order to provide utility to users of the device 100. The communications 110, 115 sent between the device 100 and the web service 102 could traverse a message-map service (not shown) which converts the communications 110,115 between differing formats used by the devices 100 and the web service 102.

For satisfying the appropriate communications 110,115, the web service 102 can communicate with the application 124 through various protocols (such as but not limited to HTTP and component API) for exposing relevant business logic (methods) to the client application 124 once provisioned on the device 100. The application programs 124 of the device 100 can use the business logic of the service 102 similarly to calling a method on an object (or a function). It is recognized that the client application programs 124 can be downloaded/uploaded in relation to the service 102, through the communications 110,115 via the gateway 104, directly to the device 100. It is further recognized that the device 100 can communicate with one or more web services 102 and associated servers 106,108 via the gateway 104.

Service Environment

Referring again to FIG. 1, the web service 102 provides information communications 110,115 which can be used by the client application programs 124 on the devices 100. Alternatively, or in addition, the web service 102 may receive and use the communications 112,113 provided by the client application programs 124 executed on the devices 100, or perform tasks on behalf of client application programs 124 executed on the devices 100. The web service 102 can be defined as a software service of the servers 106,108, which can implement an interface expressed using for example, such as but not limited to, Web Services Description Language (WSDL) registered in a Universal Discovery Description and Integration (UDDI) Registry (not shown) and can communicate through communications 110,115 with client devices 100 by being exposed over the gateway 104 through the Simple Object Access Protocol (SOAP). SOAP is a specification that defines the XML format for the communications 110,115, including a well-formed XML fragment enclosed in SOAP elements. Other parts of SOAP specify how to represent program data as XML and how to use SOAP to do Remote Procedure Calls (RPC). These optional parts of SOAP are used to implement RPC-style applications where the SOAP request communication 112,113 containing a callable function, and the parameters to pass to the function, is sent from the client device 100, and the service 102 returns the response communication 110, 115 with the results of the executed function. SOAP also supports document style applications where the SOAP communication 110,115 is a wrapper around an XML document. A further optional part of SOAP defines the HTTP binding (i.e. header), whereas some SOAP implementations support MSMQ, MQ Series, SMTP, or TCP/IP transport protocols. Alternatively, the web service 102 may use other known communication protocols, message formats, and the interface may be expressed in other web services languages than described above.

In general, web services 102 come as a replacement for legacy Browser-based and Client-Server TCP/IP connected infrastructure and applications. Originally started as a generic machine-to-machine (M2M) communication protocol, web services 102 are becoming a standard for any service-to-service (S2S) or service to consumer (S2C) communications. Based on a set of standard protocols (e.g. WSDL, SOAP, UDDI), web services 102 can provide a platform neutral communication pipe, for example XML-based, that can support synchronous and/or asynchronous communications 110, 115. The system 8 of FIG. 1 can relate to the S2C model and deals with the consumer of the web service operating from some generic device 100. Accordingly, the services supplied by the server 106,108 are utilized by the user of the devices 100 over the gateway 104.

In other cases, it is recognised that the user through the means of the wireless application 124 itself or using a wired client will send a command or registration message to the Web Service 102 or the mediator 116 to identify data format and specific rules and conditions for the asynchronous communications 115, 122, including a message ID number/label 204 (see FIG. 2) for inclusion with the asynchronous communication 112,114,118,122 so as to identify which response notification 114 corresponds with which request notification 112. This registration message will also specify the URI of the endpoint that will receive these notifications (endpoints such as but not limited to the Notification Service 108). It is further recognised that external entities can also send the registration message to the service 102 on behalf of the device 100, as well as the registration message could be part of the initial message 112.

Correlation of Notifications 112,114

Figure 2:
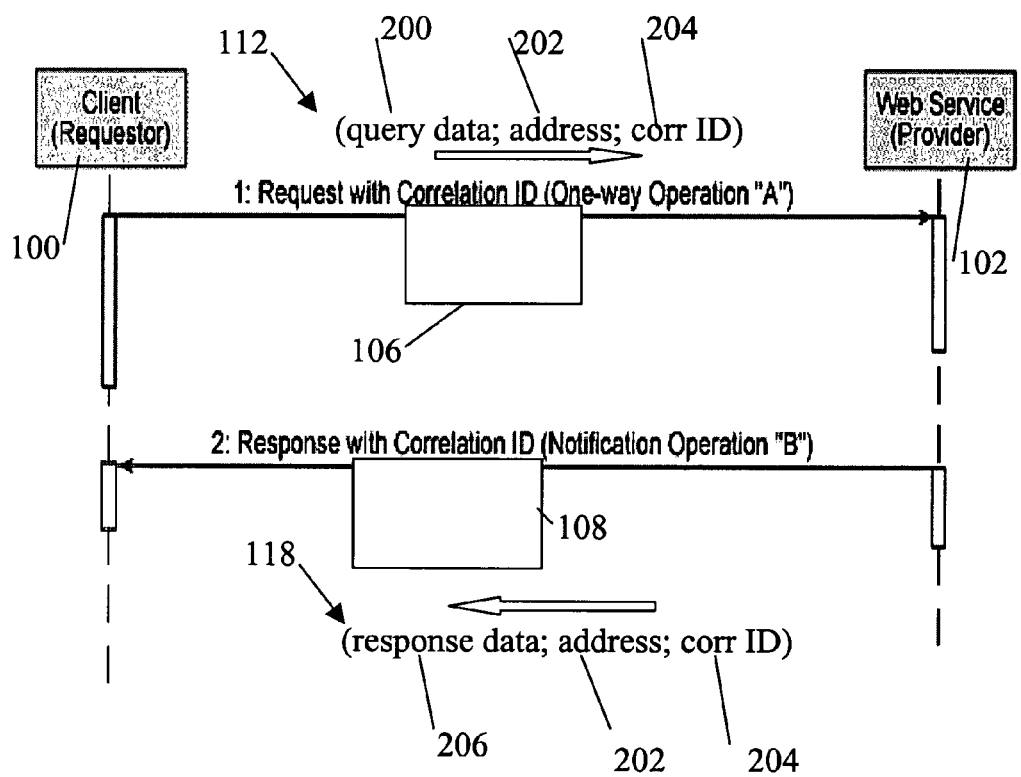
FIG. 2 is a flow diagram of direct asynchronous communications of the system of FIG. 1.

Referring to FIGS. 1 and 2, the designer of a Web Services client (i.e. device 100) needs to decide how to handle asynchronous communications 115 and how to design that his or her implementation is compatible with the way in which a service provider of the web service 102 supports asynchronous communications 115. One solution is to build asynchronous behaviour into the client device 100. The client device 100 makes the request communication 112 as part of one transaction and carries on with the thread of execution. A different thread within a separate transaction handles the response communication 114. In this model, the client device 100 as a service requestor uses a notification mechanism for sending the requests 10 and a registered listener component to receive the responses 12. Likewise, there is the correlator ID 204 (a correlation or transaction ID) exchanged between the client device 100 and web service 102 for associating response communications 114 with their corresponding request communications 112. The Reverse Notification Server 108 is the remote listener component for the device 100, and is implemented as the reverse Web Service 105 that exposes a set of all one-way operations. These operations can be invoked by the web service 102 as requested from the external client device 100 as a result of the device 100 user registering for notifications 112 with the source Web Service 102 having the service description 102 corresponding to the reverse service description 105. It is recognised application-level acknowledgement can be used in the communications 115, the operations are two-way and the response communication 114 is sent containing the correlator (correlation ID) or sequential confirmation ID 204. The application level acknowledgement could be used in communications 114, and as such, the rWSDL operations are two-way to acknowledge the receipt of the message 12 by the device 100.

It is noted that the service 108 has a first communication port 154 adapted for receiving the notification 118, 122 (e.g. an output message) of the selected service 102 as the input message to the notification service 108. The notification 118, 122 includes the correlation ID 204 for identifying the network address of the wireless device 100 intended to receive the response data 206 of the notification 118,122. The service 108 also has a second communication port 156 for coupling the notification service 108 with the wireless device 100 via a wireless gateway of the communication network. The second communication port 156 is for transmitting the asynchronous communication 114 to the wireless device 100.

The device 100 has a correlator 150 for recognising the correlation ID 204 in the response message 12, such that the correlation ID 204 identifies the network address of the wireless device 100 and matches the received response message 12 to an earlier request message 10 transmitted by the transmitter 152b to the selected service 102 from the application 124.

The asynchronous direct notification communication 118 of the web service 102 to the reverse notification server can be implemented when the web service 102 back-end has direct access to the notification data for inclusion in the response communication 114. The web service 102 also is informed of callback endpoints, has a rules engine 126, and can initiate communications 118 directly to the reverse web server 108 expressed by the reverse schema defined service 105, such as but not limited to rWSDL. The service provider of the web service 102 can expose the rules engine 126 API in the web service 102 itself or by other means. The rules engine 126 implements processing of the asynchronous communications 112, when received, including such processing as waiting for the appropriate accumulation of data to be completed before transmitting the communication 118 to the reverse server 108. It is recognised that the service 102 could share rules of the engine 126 with rules of the engine 120 of the server 116. It is also recognised that the server 108 can have a rules engine 144 for determining at what point the notification 114 is generated and transmitted to the corresponding device 100, in response to a sufficient amount of data being received as the notifications 118,122 in order to satisfy the initial notification 112. It is recognised that the server 108 can be cognisant of the information and manner (e.g. format and data content) required to satisfy the notification request 112 through it's rules engine 144 via previous knowledge of the wireless application 124 operating parameters, and/or a message 123 sent from the wireless device 100 and/or service 102 to the server 108. The message 123 could inform the server 108 of the notification(s) 112 sent to the service(s) 102 (e.g. a plurality of notifications 112 to one or more services 102) and the manner (e.g. format and data content) in which the device expects to receive the notification 114.

Referring again to FIG. 2, a direct interaction is shown between the device 100 application (client) and the source Web Service 102 without acknowledgment (transport on the network is assumed reliable). The asynchronous notification request 112 is registered or otherwise correlated with the subsequent notification 114.

When the Web Service 102 detects that the notification 112 has been sent (or generated internally by the service 102 due to a wireless device notification protocol for informing the devices 100 of information relevant to the application 124), the service 102 will use a replyTo address 202 and the identifier 204 from the initial notification request 112 to formulate the response notification 114. The replyTo address 202 can be that of the reverse Web Service 108, for example, thus providing for the device 100 to not have to wait for a two-way response from the service 102 on the same connection as the initial notification 112. In this case, the service 108 would have previous knowledge of the address of the device 100 via the correlation ID 204 (for example a table mapping IDs 204 to device 100 addresses), the message 123, and/or by secondary addresses (not shown) contained in the initial notification 112 or otherwise registered with the service 102, 108.

The rWSDL definition 105 contains a port address for the service 108. Access to the WSDL 103 of the service 102 can be provided when the provider's Web Service 102 is deployed or at runtime by passing a reference to the WSDL definition 103 on the initial request notification 112. Alternatively, the specific address 202 (for example, the URI) denoting where the response notification 118 (and ultimately notification 114) is to be sent can also be provided explicitly as a parameter on the request notification 112. It is noted in the case that the address 202 includes that of the service 108 as the call back endpoint, the notification 118 would be sent from the service 102 directly to the service 108.

It is noted that the asynchronous Web Services system 8 defines notification operations A,B in FIG. 2 (which only specify the output message). The 'correlation ID' 204 which relates the notification 114 to the previous notification request 112 is specified as a parameter in both operations A,B. The correlator ID 124 can be expressed as a table 146 which takes into account this correlation ID 204 of the response notification 114 and maps or otherwise matches this ID to the identity of the specific request notification 112 (per session) and/or to the more general identity of the client wireless device 100 that initiated the request. It is noted that the table 146 is employed by the server pushing the asynchronous response message 114,12 to the client device 100. For example, the table 146 can be employed by the mediator server 116, the service server 108, or the gateway server 104.

RWSDL Generation Algorithm for Direct Notification

Figure 3:
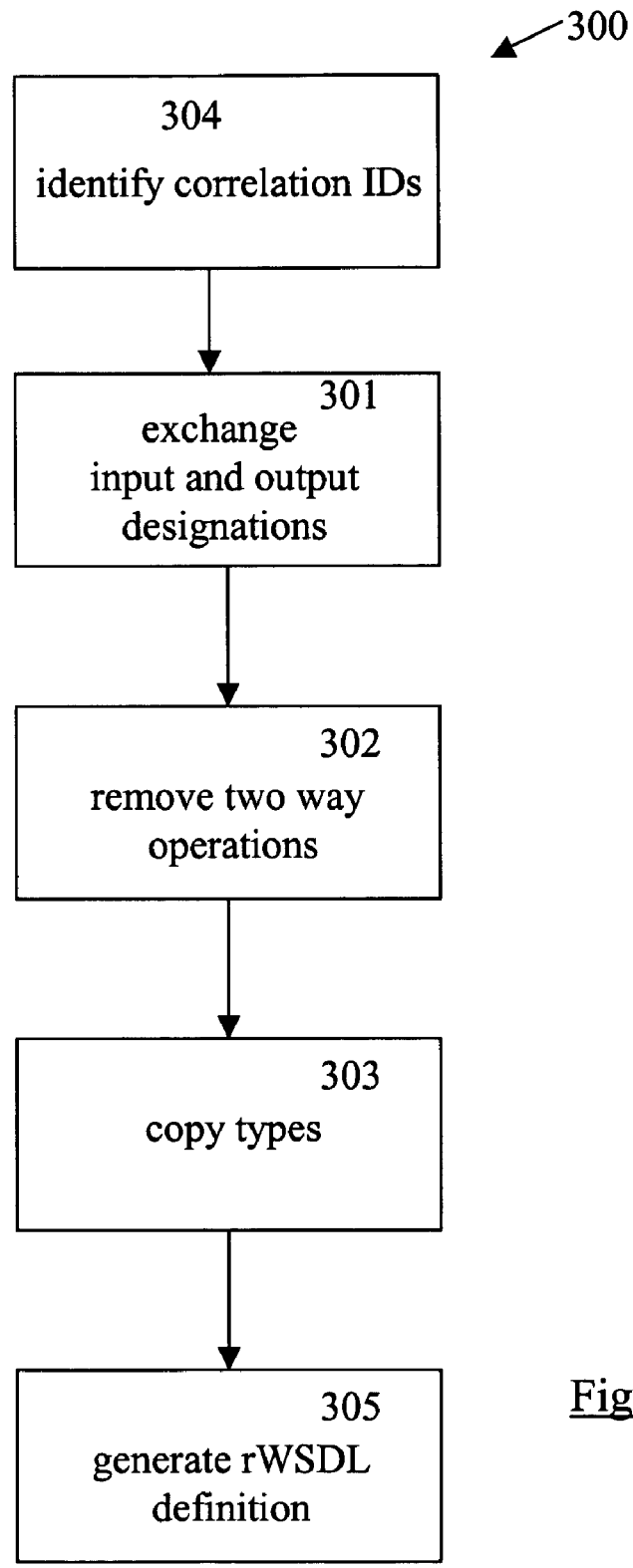
FIG. 3 is a reverse service description algorithm of the reverse service of FIG. 1.

Referring to FIG. 3, an algorithm 300 for generating the reverse web service description 105 is shown. The Reverse Service definition 105 name can be for example the source Web Service definition 103 name prefixed with 'Reverse'. This same convention can be applied to all the corresponding target namespaces, as further shown below. It is recognised in the below description that the notifications 112,114,118,122 are collectively referred to as operations.

The rWSDL 105 exposed by the Reverse Web Service 108 for direct notification 118 contains a set of one-way operations (or two way if acknowledgment is required) as follows:

step 301—operations signatures derived from selected notification operations defined by the source Web Service 102 are copied in the rWSDL 105, the difference being that the source definition 103 operation output message becomes the rWSDL 105 operation input message (note examples of the corresponding output and input messages are shown in bold in the below example definitions 103,105). These operations are derived from Request-Response Operations in the source WebService definition 103 documented[1] as asynchronous, which are identified at step 304 as having the "correlationID" 204 and the "replyTo" address 202 as parameters for the notifications 112,114/8. Note that both these parameters are present in the definitions of the notification request 112 in the source definition 103 for this operation to be selected for the rWSDL definition 105;

[1] These operations are synchronous in nature but if there is knowledge that they may be processed asynchronously (from documentation or other information sources) then the Reverse Service needs to include the counterpart notification operations.

step 302—the input messages for the source definition 103 two-way operations are removed from the rWSDL definition 105 (examples of the messages being excluded are shown in italics in the below example definitions 103, 105);

step 303—the source WSDL 103 types section are copied exactly in the rWSDL definition 105; and step 305—generate rWSDL definition.

It is noted in step 301 that the response notifications 114 to such notifications/operations 112 are sent asynchronously on an unrelated transport transmission to that of the notification 112, but the notifications 114 are directly associated with the initial request 112 having the same correlation ID 204. Further, the signature of these operations can be constructed by following the below example guidelines:

name of operation is the name of the source Web Service definition 103 prefixed with 'notify';

output source definition 103 operation message name becomes rWSDL definition 105 operation input message name;

rWSDL service 108 operation has no output message, unless application level acknowledgement is necessary;

for rWSDL service 108 operation input message parameters, 'correlation ID' 204 can be specified first;

'replyTo' 202 parameter in the source service 102 operation input message may not be copied (e.g. optional) to the notification 118 list of parameters; it can be used by the service 102 at runtime as callback endpoint address;

all other parameters of the source service 102 operation input message are copied; and the return parameter of the source service 102 operation output message can be copied at the end of the rWSDL service operation input message parameter list Example Service Definitions 103,105

This is an example source WSDL 103 of the Web Service 102 designed for asynchronous communications 115. The 'login' two-way operation requests the server 106 to generate the unique login ID (which will become the correlation ID 204 for notification). This ID 204 is then used by the one-way registration message 'placeOrder' to submit an order and register this user with this login ID 204 for notification on 'orderNotification' and 'priceUpdate'.

The rWSDL definitions 105 (listed below the source WSDL definitions 103) contains the last two notification operations (rWSDL generation algorithm step 301.) but they have the listed 'output' message as 'input' message.

Source WSDL Definition 103

```xml
<?xml version="1.0" encoding="UTF-8"?>
<definitions name="AsynchDemo" targetNamespace="http://www.your-company.com/AsynchDemo.wsdl"
xmlns="http://schemas.xmlsoap.org/wsdl/" xmlns:soap="http://schemas.xmlsoap.org/wsdl/soap/"
xmlns:tns="http://www.your-company.com/AsynchDemo.wsdl"
xmlns:xsd="http://www.w3.org/2001/XMLSchema" xmlns:xsd1="http://www.your-
company.com/AsynchDemo.xsd1">
        <types>        <!-- these are the types of step 303 -->
            <xsd:schema targetNamespace="http://www.your-company.com/AsynchDemo.xsd1"
xmlns="http://schemas.xmlsoap.org/wsdl/" xmlns:SOAP-
ENC="http://schemas.xmlsoap.org/soap/encoding/" xmlns:xsd="http://www.w3.org/2001/XMLSchema">
            <xsd:complexType name="OrderRequest">
                <xsd:sequence>
                    <xsd:element maxOccurs="1" minOccurs="1" name="clientRef" type="xsd:string" />
                    <xsd:element maxOccurs="1" minOccurs="1" name="quantity" type="xsd:int" />
                    <xsd:element maxOccurs="1" minOccurs="1" name="symbol" type="xsd:string" />
                    <xsd:element maxOccurs="1" minOccurs="1" name="price" type="xsd:double" />
                </xsd:sequence>
            </xsd:complexType>
            </xsd:schema>
        </types>
    <message name="priceUpdateMessage">
        <documentation>Current stock price notification</documentation>
        <part name="loginId" type="xsd:string" />         <!-- this is the correlation ID 204 -->
        <part name="symbol" type="xsd:string">
            <documentation>stock symbol</documentation>
        </part>
        <part name="price" type="xsd:double">
            <documentation>quoted price</documentation>
        </part>
    </message>
    <message name="loginId">
        <part name="id" type="xsd:string" />
    </message>
    <message name="loginName">
        <part name="name" type="xsd:string" />
    </message>
    <message name="orderStatusMessage">
        <part name="loginId" type="xsd:string" />         <!-- this is the correlation ID 204 -->
```

-continued

```xml
    <part name="traderId" type="xsd:string" />
    <part name="orderRef" type="xsd:string" />
    <part name="status" type="xsd:string" />
 </message>
<message name="placeOrderRequest">        <!- this is the removed messages of step 302 ->
    <part name="loginId" type="xsd:string" />      <!-- this is the correlation ID -->
    <part name="notifyEndpoint" type="xsd:anyURI" /> <!-- this is the replyTo address -->
    <part name="order" type="xsd1:OrderRequest" />
 </message>
<portType name="AsynchDemoPortType">
<operation name="login">         <!- this is the removed messages of step 302 ->
    <documentation>The correlation ID is generated by the server in this two-way
operation</documentation>
    <input message="tns:loginName" />
    <output message="tns:loginId" />
 </operation>
<operation name="placeOrder">
    <documentation>This is the notification registration one-way request (request to place an order and
be notifed of its status asap)</documentation>
    <input message="tns:placeOrderRequest" />
 </operation>
<operation name="orderNotification"> <!- these are the output messages of step 301 ->
    <documentation> </documentation>
    <output message="tns:orderStatusMessage" />
 </operation>
<operation name="priceUpdate">
    <output message="tns:priceUpdateMessage" />
 </operation>
 </portType>
<binding name="AsynchDemoBinding" type="tns:AsynchDemoPortType">
    <soap:binding style="rpc" transport="http://schemas.xmlsoap.org/soap/http" />
    <operation name="login">
        <soap:operation soapAction="capeconnect:AsynchDemo:AsynchDemoPortType#login" />
        <input>
            <soap:body encodingStyle="http://schemas.xmlsoap.org/soap/encoding">
namespace="http://www.your-company.com/AsynchDemo/binding" use="encoded" />
        </input>
        <output>
            <soap:body encodingStyle="http://schemas.xmlsoap.org/soap/encoding">
namespace="http://www.your-company.com/AsynchDemo/binding" use="encoded" />
        </output>
    </operation>
    <operation name="placeOrder">
         <soap:operation soapAction="capeconnect:AsynchDemo:AsynchDemoPortType#placeOrder" />
        <input>
            <soap:body encodingStyle="http://schemas.xmlsoap.org/soap/encoding/"
namespace="http://www.your-company.com/AsynchDemo/binding" use="encoded" />
        </input>
    </operation>
    <operation name="orderNotification">
        <soap:operation
soapAction="capeconnect:AsynchDemo:AsynchDemoPortType#orderNotification" />
        <output>
            <soap:body encodingStyle="http://schemas.xmlsoap.org/soap/encoding/"
namespace="http://www.your-company.com/AsynchDemo/binding" use="encoded" />
        </output>
     </operation>
    <operation name="priceUpdate">
        <soap:operation soapAction="capeconnect:AsynchDemo:AsynchDemoPortType#priceUpdate" />
        <output>
            <soap:bodyencodingStyle="http://schemas.xmlsoap.org/soap/encoding/"
namespace="http://www.your-company.com/AsynchDemo/binding" use="encoded" />
        </output>
     </operation>
 </binding>
<service name="AsynchDemo">
<port binding="tns:AsynchDemoBinding" name="AsynchDemoPort">
    <soap:address location="jms:queue:CCDemoQueue" />
 </port>
 </service>
 </definitions>
```

Reverse Web Service WSDL Description 105 'portType' is Shown Below:

```xml
<?xml version="1.0" encoding="UTF-8"?>
<definitions name="ReverseAsynchDemo" targetNamespace="http://www.your-
company.com/ReverseAsynchDemo.wsdl" xmlns="http://schemas.xmlsoap.org/wsdl/"
xmlns:soap="http://schemas.xmlsoap.org/wsdl/soap/" xmlns:tns="http://www.your-
company.com/ReverseAsynchDemo.wsdl" xmlns:xsd="http://www.w3.org/2001/XMLSchema"
xmlns:xsd1="http://www.your-company.com/AsynchDemo.xsd1">
        <types> ... </types> <!- these are the copied types of step 303 ->
...
<message name="priceUpdateMessage">
        <documentation>Current stock price notification</documentation>
        <part name="loginId" type="xsd:string" />   <!-- this is the correlation ID 204 -->
        <part name="symbol" type="xsd:string">
            <documentation>stock symbol</documentation>
        </part>
        <part name="price" type="xsd:double">
            <documentation>quoted price</documentation>
        </part>
    </message>
<message name="orderStatusMessage">
        <part name="loginId" type="xsd:string" />   <!-- this is the correlation ID 204 -->
        <part name="traderId" type="xsd:string" />
        <part name="orderRef" type="xsd:string" />
        <part name="status" type="xsd:string" />
    </message>
Note, two way operations of the definition 103 are removed as per step 302.
<portType name="ReverseAsynchDemoPortType">
        <operation name="notifyorderNotification">   <- these are now input messages of step
301 ->
            <input message="tns:orderStatusMessage" />
        </operation>
        <operation name="notifypriceUpdate">
            <input message="tns:priceUpdateMessage" />
        </operation>
</portType>
...
```

It is noted in the above example that step 301 of FIG. 3 resulted in the identified operations (those associated with the correlation ID 204) were converted from output messages to input messages, the types of the definition 103 were retained for generation of the definition 105 via step 303, and the two-way operations were removed from the definition 105 via step 302.

Figure 4:
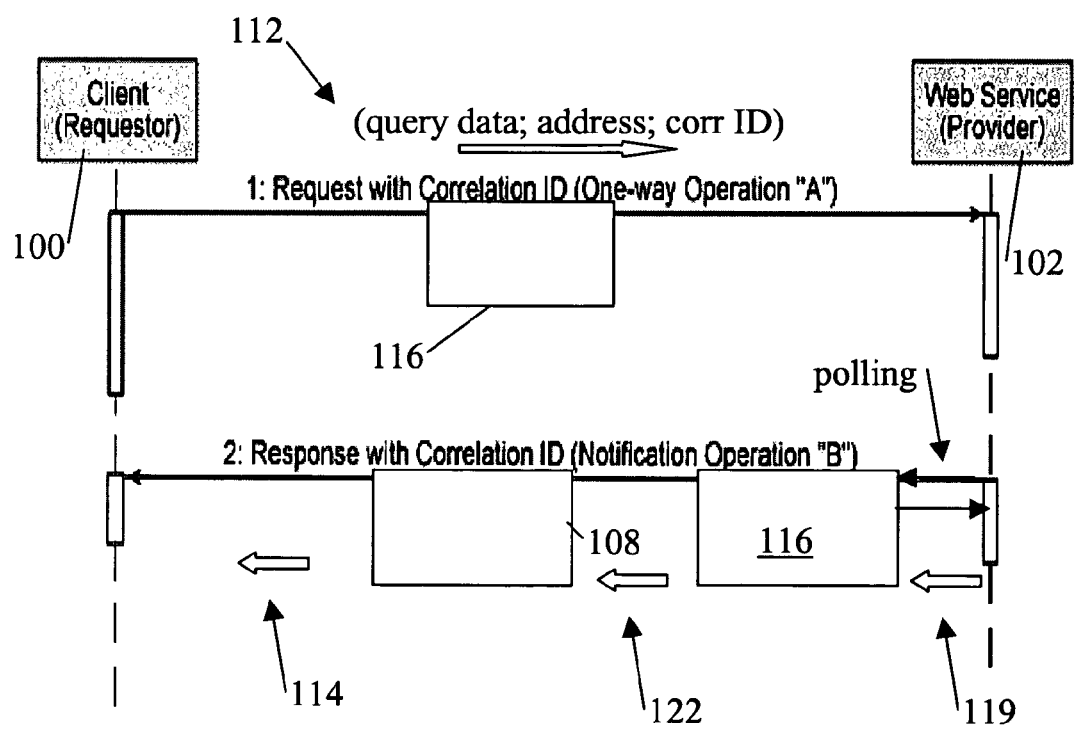
FIG. 4 is a flow diagram of indirect asynchronous communications of the system of FIG. 1.

Referring to FIG. 4, an indirect interaction is shown between the device 100 application (client) and the source Web Service 102 through use of the polling server 116, without acknowledgment (transport on the network is assumed reliable). The asynchronous request notification 112 is registered or otherwise correlated with the subsequent notification 114 via the correlation ID 204. It is recognised that the polling server 116 may not include the correlation ID 204 in the communication 119, rather keep the correlation ID 204 for inclusion in the notification 122 to the service 108. For example, the address 202 in the notification 112 would be the device address and the correlation ID 204 present in the notification 112 would indicate to the polling server 116 that asynchronous communication 115 is desired. The address 202 in the polling communications 119 would be that of the polling server 116 and the address 202 in the notification 122 would be that of the service 108. Once receiving the notification 122, the service 108 would either be aware of the address of the device 100 or the address of the device 100 could also be included in the notification 122. The notification 122 could also have the correlation ID 204 to allow the service 108 to match the response notification 114 to the respective device 100 through the table 146 (see FIG. 1). The correlation ID 204 would be present in the notification 114 so as to allow the gateway 104 and/or the device 100 to match the notification 114 with the original notification 112.

In the Mixed Synchronous/Asynchronous Notification Through the Mediator (polling agent) server 116, the Mediator server is a component which stores user defined notification rules in the engine 120, such as by the user but, may not have direct access to content. For example, the client device 100 can send an indirect Notification Request 112 through the mediator server 116, requesting a response to a message having operations A and B. The mediator server 116 is designed to poll the source Web Service 102 at well defined intervals, to collect data (or data changes) and to trigger notifications 122 to the client device 100 (through the service 108 as notification 114) when conditions for transmission are met. The rules engine 120 of the mediator server 116, for example, can specify that the mediator server 116 obtains operation A and operation B responses synchronously (communication 119) before proceeding to send asynchronously the corresponding response notification 122 to the Reverse Notification service 108 for subsequently satisfying the original request notification 112 having required operations A and B. It is recognized that the functionality of the mediator server 116 may be hosted by the provider of the Reverse WSDL, the service 108, but it could also be hosted by a $3^{rd}$ party as shown.

rWSDL Generation Algorithm Indirect Notifications

As with the rWSDL generation algorithm for direct notification given above with FIG. 3, the Reverse Service 108 name can have the source for Web Service 102 name prefixed with 'Reverse'. The same convention applies to all the target namespaces. Generally similar to the direct notification algorithm 300, the rWSDL exposed by the Reverse Service 108 when working with the mediator server 116 contains the set of the following one-way operations:
1. Operations derived from data retrieval operations in the source Web Service 102 that have the 'correlationID' 204 (or similar) as a parameter in the input message. Typically these operations are prefixed with "get" but other naming conventions can be used. The operations in the reverse WSDL definition 105 are used with the mediator server 116 (preferably the original 'getXXX' operations are made wireless friendly, so that the user will be notified with the data, rather than requesting it).
2. The signature of these operations can be constructed by following these guidelines:
    name of operation is the name of the source Web Service 102 prefixed with 'notify';
    output source service 102 operation message name becomes rWSDL operation input message name;
    rWSDL operation has no output message, unless application level acknowledgement is necessary;
    for rWSDL operation input message parameters, 'correlationID' 204 can be specified first;
    all other parameters of the source service 102 operation input message are copied; and
    the return parameter of the source service 102 operation output message can be copied at the end of the rWSDL operation input message parameter list.
3. The source service 102 WSDL types section are copied exactly in the rWSDL.
4. The input messages for the source service 102 operations that will be polled are not be present in rWSDL.

Notification Rules Engine and Rules Registration API

The mediator server 116 or polling agent hosts the rules engine 120 that is used to know:
    how and when to poll for data for a particular user and application 124;
    if it is polling for data or data changes, the latter simplifies the polling agent and involves the source Web Service 102; and
    what are the conditions to be met which should trigger the notification 122 to be sent to the client device 100 via the service 108 for a specified user.

As well, the mediator server 116 exposes a rules registration API for the user of the device 100 to be able to register the desired notification rules concerning the notification 112 or notifications in general. It is recognised that the rules registration API could also be used by the engine 144 of the service 108 as contacted by the communication 123 (see FIG. 1) from the device when (or prior to) the notification 112 is sent to the server 106.

EXAMPLE

RULEENGINE API registerForNotification
    application :: String,
    sourceWSDLUri :: String,
    sourceOperation :: String,
    correlationID :: String,
    pollingFrequency :: int,
    rule :: String A sample registration could look like:

RuleEngine::registerForNotification
    ("AsynchDemo", "http://asyncws.demo.com/AsyncDemo?WSDL",
    "getOrderStatus",
    "myDeviceID", "10", "orderRef = 1234567")

This API may be accessible from both wireless and wired networks and can be exposed by another WebService 102. The rWSDL definitions 105 (listed below the source WSDL definitions 103) contains the 'output' messages as 'input' messages and shows an example of the polling operations removal as per point (4) above.

EXAMPLE

Source Web Service 103 'portType':

```
...
<message name="getOrderStatusIn">
    <part name="loginId" type="xsd:string"/>      <!-- this is the correlation ID 204 -->
    <part name="orderRef" type="xsd:string"/>
</message>
<message name="getOrderStatusOut">
    <part name="orderRef" type="xsd:string"/>
    <part name="status" type="xsd:string"/>
</message>
<message name="placeOrderRequest">
    <part name="loginId" type="xsd:string"/>    <!-- this is the correlation ID 204-->
    <part name="order" type="xsd1:OrderRequest"/>
</message>
<message name="placeOrderRequestOut">
    <part name="traderId" type="xsd:string"/>
    <part name="orderRef" type="xsd:string"/>
</message>
<portType name="AsynchDemoWithPollingPortType">
    ...
    <operation name="placeOrder">
        <documentation>This time this is a two-way operation to get the order ref</documentation>
        <input message="tns:placeOrderRequest"/>
        <output message="tns:placeOrderRequestOut"/>
```

-continued

```
        </operation>
        <operation name="getOrderStatus">
            <documentation>-- This is the operation that will be polled!--- </documentation>
            <input message="tns:getOrderStatusIn" />
            <output message="tns:getOrderStatusOut"/>
        </operation>
    <portType>
    ...
``` rWSDL 'portType':

```
    <message name="notifyOrderStatusIn">
        <part name="loginId" type="xsd:string"/>        <!-- this is the correlation ID 204 -->
        <part name="orderRef" type="xsd:string"/> <!-- Specified in the polling rule of the server
116-->
        <part name="status" type="xsd:string"/>
    </message>
    <message name="placeOrderRequest">
        <part name="loginId" type="xsd:string"/>    <!-- this is the correlation ID 204 -->
        <part name="order" type="xsd1:OrderRequest"/>
    </message>
    <message name="placeOrderRequestOut">
        <part name="traderId" type="xsd:string"/>
        <part name="orderRef" type="xsd:string"/>
    </message>
    <portType name="AsynchDemoWithPollingPortType">
    ...
        <operation name="placeOrder">
            <documentation>This is a two-way op to get the order ref </documentation>
            <input message="tns:placeOrderRequest"/>
            <output message="tns:placeOrderRequestOut"/>
        </operation>
        <operation name="notifyOrderStatus">
            <documentation> -------- This is the notification ------</documentation>
            <input message="tns:notifyOrderStatusIn" />
        </operation>
    ...
    </portType>
```

Figure 7:
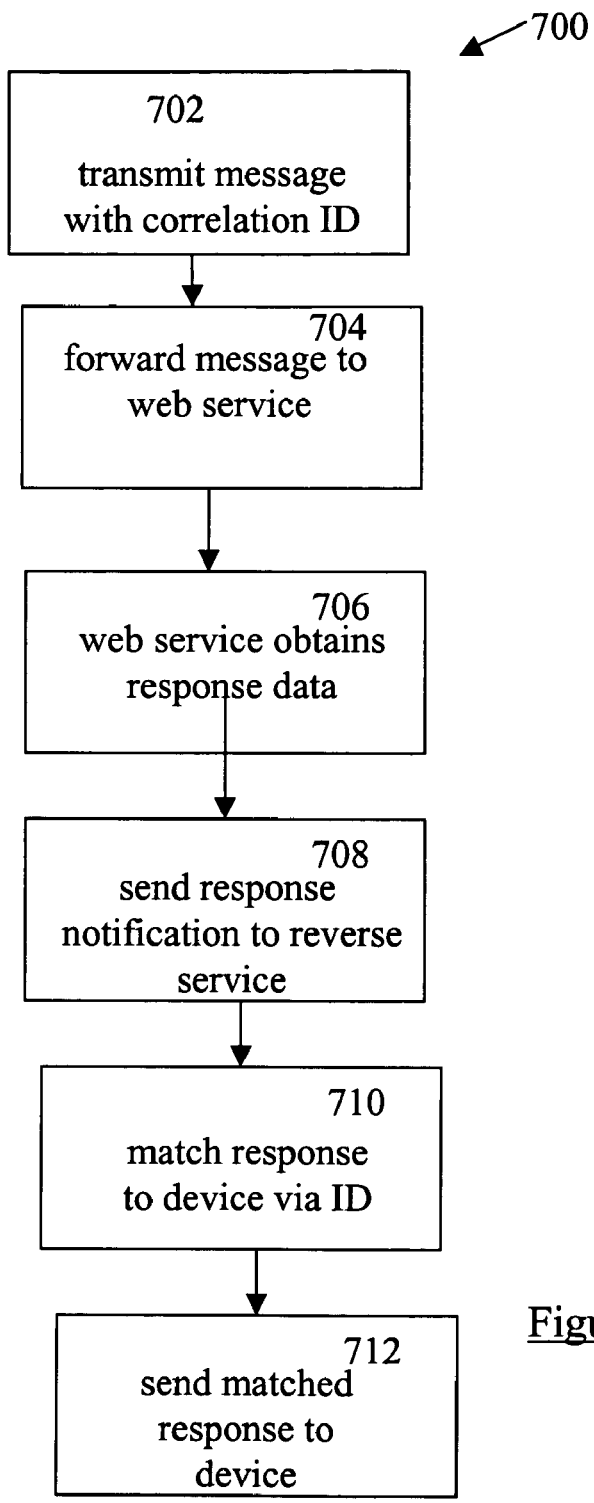
FIG. 7 is an operation of the system of FIG. 1.

Referring to FIGS. 1 and 7, the operation 700 of the system 8 is described. At step 702, the application 124 of the device 100 transmits the message 10 (with for example query data 200) intended as the asynchronous message 12 containing the correlation ID 204 and service 108 address 202 (see FIG. 2), to the gateway 104, which is redirected as request notification 112 to the server 106. The server 106 at step 704 forwards the notification request 112 to the service 102. It is noted at this point that the device 100 now is free to continue operation of the application 124 without waiting for the response 10 on the same connection as the original request 12. The service obtains 706 the information (response data 206) to satisfy the notification 112 and sends 708 this as notification 118 to the service 108. It is recognised that step 708 could also involve the service 102 sending the response data 206 first to the mediator server 116 which then forwards the data 206 onto the reverse service 108. The service 108 sends 712 the response notification 114 including the response data 206 and correlation ID 204 to the gateway 104 for eventual transmission 714 to the address of the device 100. It is recognised that either the service 108 and/or the gateway 104 can use the table 146 to match 710 the correlation ID to the address of the device 100.

A further embodiment to the above system 8 is for the case of direct notification to mini Web Service on the device 100. A more powerful device 100 can host a mini reverse notification Web Service 108 and the notifications 114 can be delivered directly to it, without the need for the Mediator server 116. In this case the sender is capable of addressing the device 100 and actively initiating notifications 112,114. The device 100 is capable of processing SOAP or another message encoding specified in the notification WSDL definitions 103. Communication with the wired Web Service 102 from the wireless device 100 can be achieved using a mix of both synchronous and asynchronous techniques, as described above. The device application 124 can be designed to allow direct, synchronous invocations 10 of specific Web Service 102 request/response operations. In this case, the application will wait (block) to receive the response 12. The synchronous invocations 10 from the device 100 can be made more efficient if they are performed on behalf of the device 100 by a service proxy 106 while the device 100 proxy communication is completely asynchronous. In this case, it is envisioned that the server 106 is part of the service 108, situated in a wired environment in communication with the device via the wireless gateway 104.

Alternative Topologies for Hosting the Mediator Server 116

Figure 5:
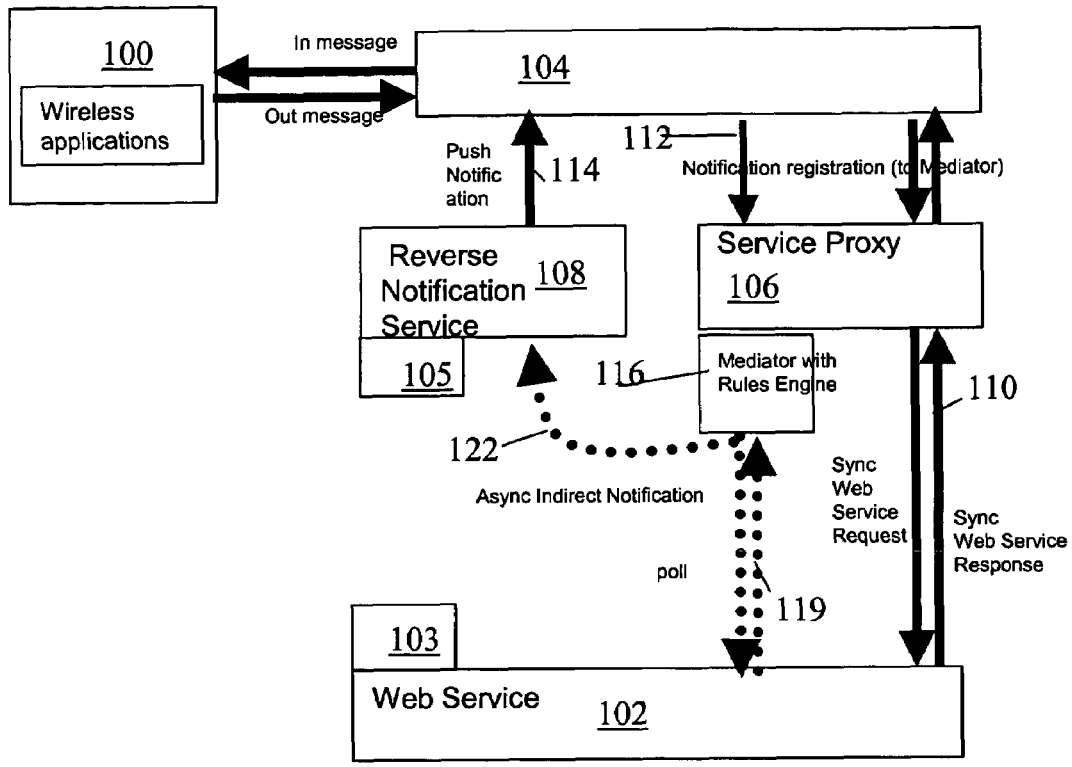
FIG. 5 is an alternative embodiment of the system of FIG. 1.
Figure 6:
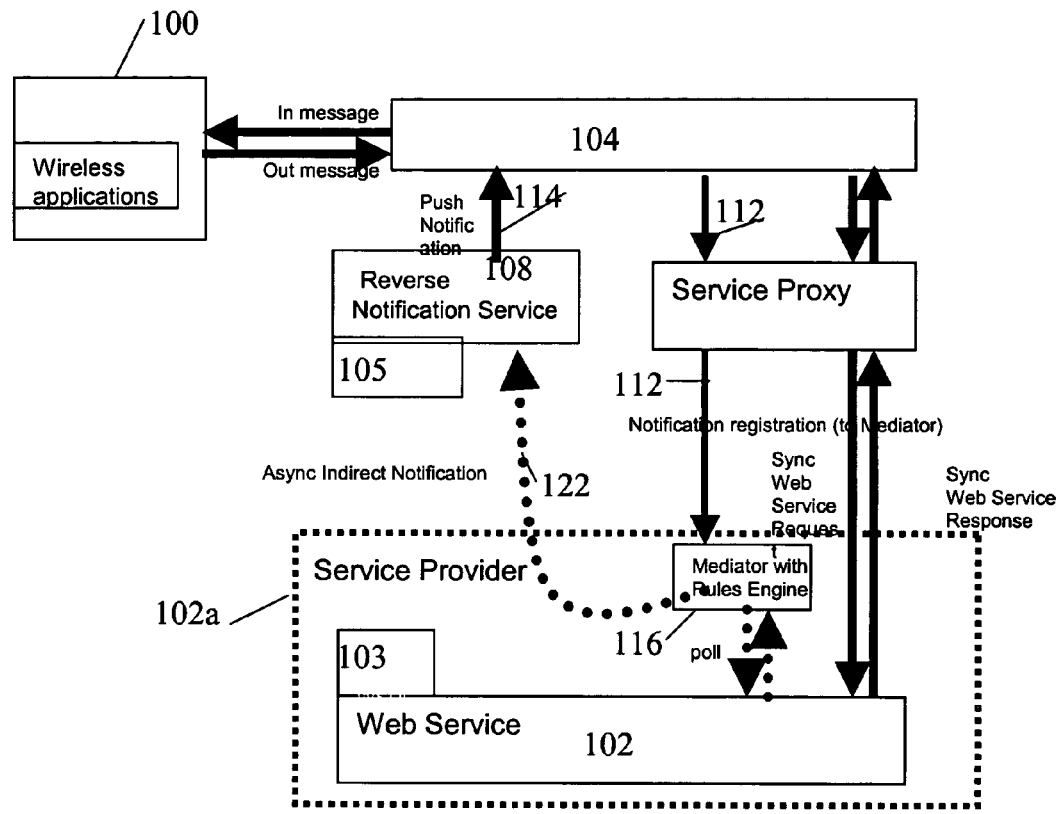
FIG. 6 is a further embodiment of the system of FIG. 1.

Referring to FIG. 5, "topology A", is such that the Mediator server 116 is coupled with the service proxy 106. Referring to FIG. 6, in "topology B" the mediator server 116 is hosted by the web service's 102 Service provider 102a, such that the polling communications 119 are internal to the provider 102a. In all 3 topologies (FIGS. 1,5,6), the Mediator server 116 communicates 119 synchronously with the Web Service 102 and asynchronously 115 with the Reverse Notification Service 108.

We claim:

1. A method for providing asynchronous communication between an application executing on a wireless device and a synchronous service executing on a server via a communication network, the service having a source schema definition defining a plurality of input and output messages for accessing the service, the method comprising the steps of:
   sending a notification request to a mediator, the notification request comprising a notification message, a correlation identity (ID), and a response address;
   communicating synchronously between the mediator and the service to transmit the notification message and receive a corresponding response message;
   transmitting the response message to a reverse notification server as a notification response, the reverse notification server identified by the response address and comprising a reverse source schema definition in which output messages of the source definition schema of the service are defined as input messages; and
   identifying the wireless device using the correlation ID;
   transmitting the notification response to the wireless device identified by the correlation ID.

2. The method of claim 1 comprising the further step of determining when to transmit the response message in accordance with a predefined rule set.

3. The method of claim 2, wherein a rule of the rule set specifies that at least two response messages are to be received by the mediator prior to transmitting the response message to the reverse notification server.

4. The method of claim 3, further comprising the step of combining content of the response messages into a single notification response.

5. The method of claim 1, further comprising the step of the mediator polling the service on a periodic basis.

6. The method of claim 5, wherein the mediator polls the service to obtain information in response to the notification request.

7. A communication network for facilitating asynchronous communication between an application executing on a wireless device and a synchronous service executing on a server, the service having a source schema definition defining a plurality of input and output messages for accessing the service, the communication network comprising:
   a communication gateway for receiving a notification request from the wireless device destined for the service, the notification request comprising a notification message, a correlation identity (ID), and a response address;
   a reverse notification server identifiable by the response address, the reverse notification server comprising a reverse source schema definition in which output messages of the source definition schema of the service are defined as input messages, the reverse notification server thereby being configured to receive a notification response and transmit it to the wireless device identified in accordance with the correlation ID, and
   a mediator for facilitating communication with the service, the mediator conficiured to:
      receive the notification request from the communication gateway;
      communicate synchronously with the service to transmit the notification message and receive a corresponding response message; and
      transmit the response message to the reverse notification server as the notification response.

8. The communication network of claim 7, wherein the reverse notification server is implemented on at least one of: the wireless device, the service proxy, or a third party server.

9. The communication network of claim 7, wherein the reverse notification server further comprises a correlation table used to match the correlation ID with the corresponding wireless device.

10. The communication network of claim 7 wherein the mediator further comprises a rules engine configured to determine when to transmit the response message in accordance with a predefined rule set.

* * * * *